(12) United States Patent
Shiozaki

(10) Patent No.: US 6,215,524 B1
(45) Date of Patent: Apr. 10, 2001

(54) ELECTRONIC VIDEO RECORDING DEVICE HAVING A MONITOR SCREEN ON THE REAR FACE AND A ROTARY VIDEO RECORDING CAMERA ATTACHED TO THE MAIN BODY

(75) Inventor: Mamoru Shiozaki, Toyonaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/006,002

(22) Filed: Jan. 12, 1998

(30) Foreign Application Priority Data

Jan. 14, 1997 (JP) .................................................. 9-004309

(51) Int. Cl.⁷ .......................... H04N 5/225; H04N 5/222
(52) U.S. Cl. .................... 348/376; 348/333; 358/906; 396/374; 248/919
(58) Field of Search ................................. 248/917, 918, 248/919, 920, 921; D16/202; 396/373, 374, 378, 381, 383; 358/906, 909.1; 348/207, 333, 334, 373, 374, 375, 376; H04N 5/222, 5/225

(56) References Cited

U.S. PATENT DOCUMENTS

| | | | |
|---|---|---|---|
| D. 391,280 | * 2/1998 | Miki | D16/202 |
| D. 406,158 | * 2/1999 | Akiyama | D16/202 |
| 5,442,453 | * 8/1995 | Takagi | 348/374 |
| 5,559,554 | * 9/1996 | Uekane | 348/333 |
| 5,742,341 | * 4/1998 | Ohishi | 348/373 |
| 5,949,504 | * 9/1999 | Kim | 348/333 |
| 5,982,429 | * 11/1999 | Kamamoto | 348/333 |

* cited by examiner

Primary Examiner—Tuan Ho
Assistant Examiner—Ngoc-Yen Vu
(74) Attorney, Agent, or Firm—Parkhurst & Wendel, L.L.P.

(57) ABSTRACT

An electronic video recording device has a video recording camera for converting optical information received through an object lens into electronic video information, a monitor screen for displaying electronic video information output from the video recording camera, and a main body having a monitor screen and a control panel for operating the video recording camera. The main body has the monitor screen on a rear face, control panel around a first side face, and a rotary shaft of the video recording camera on a second side face in which a rotary shaft is disposed in a direction approximately perpendicular to the second side face. An incident optical axis of the object lens on the video recording camera is approximately perpendicular to the rotary shaft of the rotary mechanism so that the object lens faces downward when in a housed configuration.

5 Claims, 4 Drawing Sheets

ELECTRONIC VIDEO RECORDING DEVICE HAVING A MONITOR SCREEN ON THE REAR FACE AND A ROTARY VIDEO RECORDING CAMERA ATTACHED TO THE MAIN BODY

FIELD OF THE INVENTION

The present invention relates to the field of electronic video recording devices including video tape recorders and electronic cameras employing large monitors such as liquid crystal displays.

BACKGROUND OF THE INVENTION

A broad range of forms of electronic video recording devices including video tape recorders and electronic cameras have recently been developed. In particular, video recording devices with large monitors for recording the camera operator while providing direct feedback on a screen visible to the camera operator, so-called self-recording (or facing recording), are drawing more attention.

A video recording device of the prior art related to the present invention is explained next.

FIGS. 3A to 3C show perspective views of the electronic video recording device of the prior art. FIG. 3A shows a front perspective, and FIGS. 3B and 3C show back perspectives. A video recording camera 101 is disposed around an upper corner of a front face 102a of a main body 102, and the video recording camera 101 has an object lens 103. Optical information entering the video recording camera 101 through the object lens 103 is converted to electronic video information. The main body 102 records the electronic video information output from the video recording camera 101 on a housed video tape (not illustrated). A monitor 105 converts the electronic video information output from the video recording camera 101 or the electronic video information reproduced from a recorded video tape into optical information, and displays it on a monitor screen 105a. The monitor 105 is, as shown in FIG. 3C, rotatably attached to the main body 102 with a rotary mechanism disposed at an upper part of the main body 102. A microphone 106 is disposed beneath the object lens 103 on the front face 102a of the main body 102 for recording sound from approximately the same direction as the optical axis of the object lens 103. The main body 102 records sound information, along with the aforementioned electronic video information, on a video tape.

The operation of the electronic video recording device of the prior art as configured above is explained next.

In ordinary recording, that is, when the camera operator records subjects other than himself/herself by looking at a monitor screen, the object lens 103 is facing the subject, as shown in FIGS. 4A to 4C, and the camera operator can confirm what is being recorded by looking at the monitor screen 105a. Since the monitor 105 is rotatable away from the main body, the camera operator can easily look at the monitor screen 105a at any angle particularly at an angle which allows recording from a high position downward (so-called high angle, as shown in FIG. 4A), to record ordinarily by holding the electronic video recording device around in front of the chest (the so-called chest angle shown in FIG. 4B), and to record from a low position upward (the so-called low angle shown in FIG. 4C).

In "self-recording" in which the camera operator is recorded while looking at his/her own image on the monitor screen 105a, the camera operator can confirm what to be recorded on the monitor screen 105a by rotating the monitor 105 to the front to the side of the object lens 103 because the monitor 105 is rotatable apart from the main body 102. As already known, some existing devices are equipped with the function of inverting the video image on the monitor screen 105a by detecting the rotation angle.

Another example of the prior art is an electronic video recording device in which the camera operator operates and holds an area of the recording camera by hand, and the monitor is rotatably supported by the video recording camera together with the main body.

The above configurations of the prior art, however, have the following inconveniences:

1) To secure the distance required by the optical system of the video recording camera and also assure that the thickness of the main body is sufficient to allow it to be held comfortably in the hand, the length of the video recording camera needs to be longer than the thickness of the main body, making the camera protrude significantly from the main body.

2) Since the object lens and the main body are held toward the direction of the subject to be recorded, the angle of the wrist required to hold the device changes according to recording angle, and there are some angles which result in difficulties in holding the device.

3) Since the object lens always remains in a lateral position even when not recording anything, the object lens is likely to be directly exposed to bright light including direct sunlight, resulting in flare and other problems characteristic of CCD image pickup elements in the video recording camera, or dust is likely to attach to the object lens.

SUMMARY OF THE INVENTION

The present invention offers an electronic video recording device which enables the securing of a sufficient distance between the optical system of the video recording camera while keeping the thickness of the main body to a level easy to hold when the video recording camera is housed; enables the monitoring of the picture being recorded without changing the wrist angle too much while holding the device at a range of recording angles; and provides a configuration whereby the object lens is not directly exposed to bright light including direct sunlight and is protected from dust accumulation when the device is not being used for recording.

The electronic video recording device of the present invention thus comprises a video recording camera for converting optical information entering from the object lens into electronic video information, a monitor screen for displaying electronic video information output from the video recording camera, and a main body which has a control panel for operating the video recording camera and a monitor screen. The main body has the monitor screen located on its rear side, the control panel on its first side face, and a rotary mechanism of the video recording camera on its second side face. The rotary mechanism has a rotary shaft in a direction approximately perpendicular to the second side face. The incident optical axis of the object lens on the video recording camera is approximately perpendicular to the rotary shaft of the rotary mechanism, and the rotary shaft is configured in a way which allows the object lens to face downward when housing the video recording camera. This enables the securing of a sufficient distance for the optical system of the video recording camera, realizes a comfortable thickness for holding the main body when the video recording camera is housed, and allows the monitoring of the picture to be recorded at any recording angle without changing the wrist angle when holding the device. In addition, the object lens is protected from dust and not directly exposed to bright light, such as direct sunlight, except during recording.

Furthermore, the electronic video recording device of the present invention comprises a video recording camera for converting optical information entering from the object lens to electronic video information, a monitor screen for displaying electronic video information output from the video recording camera, and a main body which has a control panel for operating the video recording camera and a monitor screen. The main body has the monitor screen located at its rear side, a rotary mechanism of the video recording camera on its second side face in which a rotary shaft is disposed in a direction approximately perpendicular to the second side face, and the control panel on its first side face. This enables single hand recording without placing too much strain on the hand holding the main body.

The electronic video recording device of the present invention still further comprises a video recording camera for converting optical information entering from the object lens into electronic video information, and a main body which has a control panel for operating the video recording camera and a rotary mechanism for rotatably supporting the video recording camera. The weight ratio of the video recording camera and the main body is 1:3 to 1:7. This enables single hand recording without placing too much strain on the hand holding the main body. At the same time, there is no need for a large and robust rotary mechanism because the video recording camera is lighter than the main body, and this allows the device to be smaller.

DESCRIPTION OF THE PREFERRED EMBODIMENT

An exemplary embodiment of the present invention is explained with reference to FIGS. 1A to 2C.

Figure 1A:
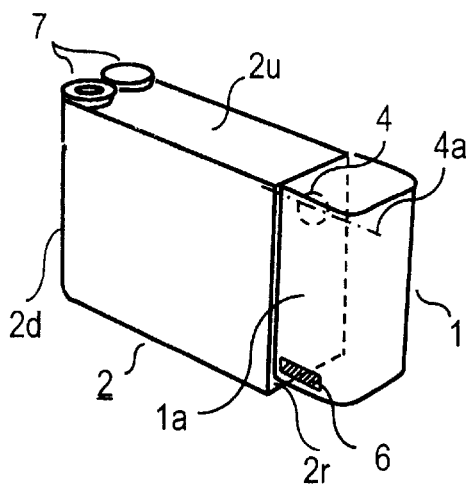
FIG. 1A is a front perspective view of an electronic video recording device in accordance with an exemplary embodiment of the present invention.

FIG. 1A shows an exemplary embodiment when an electronic video recording device of the present invention is housed. A video recording camera 1 is an approximate rectangular parallelepiped shape, and is disposed at a right side face 2r (a second side face) of a main body 2. A control panel 7 consisting of control switches for operating the video recording camera 1 to record video images is disposed on a top face 2u of the main body 2 preferably at a position far from the video recording camera 1. A microphone 6 is disposed on a lower part of a front face 1a of the video recording camera 1. During recording, the camera operator holds around a left side face 2d (a third side face) and its nearby area of the main body 2.

Figure 1B:
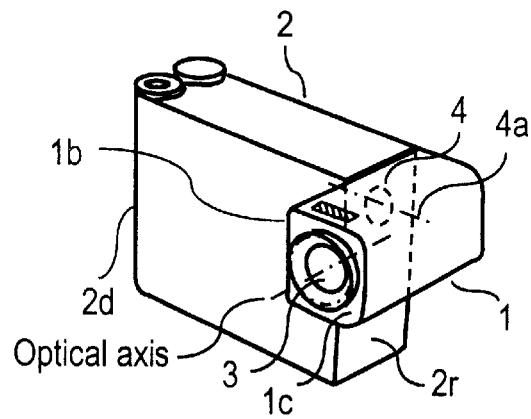
FIG. 1B is a front perspective view of the electronic video recording device in accordance with the exemplary embodiment of the present invention at recording.

FIG. 1B shows an exemplary embodiment when an electronic video recording device of the present invention is used for recording. Compared to FIG. 1A, during housing, FIG. 1B shows the video recording camera 1 in a position when it is rotated 90° by a rotary mechanism 4 against the main body 2. The video recording camera 1 has an object lens 3 disposed on its bottom face 1c, and optical information entering from, i.e., received through the object lens 3 is converted into electronic video information. The main body 2, the same as that of the prior art, records electronic video information output from the video recording camera 1 onto a video tape (not illustrated), and houses a battery (not illustrated) for supplying power to the video recording camera 1 and power required for recording. The rotary mechanism 4 is provided on the main body 2 at an upper part of the right side face 2r (the second side face) of the main body 2 for supporting the video recording camera 1 by a side face 1b (a first side face) facing the main body 2 so that the bottom face 1c of the video recording camera 1 can be rotated. The first side face 1b and the second side face 2r contact or are adjacent to each other with just a little distance. The rotary mechanism 4 provides a rotating connection between the video recording camera 1 and the main body 2 while keeping an appropriate rotary resistance therebetween. A rotary shaft 4a is disposed approximately perpendicular to the first side face 1b and the second side face 2r. The microphone 6 is disposed at a lower part of the front face 1a of the video recording camera 1 for collecting sound from approximately the same direction as the optical axis of the object lens 3 and recording sound information, as with the aforementioned electronic video information, onto a video tape by the main body.

Figure 1C:
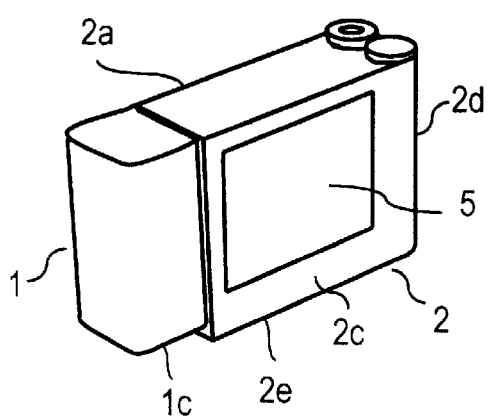
FIG. 1C is a back perspective view of the electronic video recording device in accordance with the exemplary embodiment of the present invention at housing.
Figure 1D:
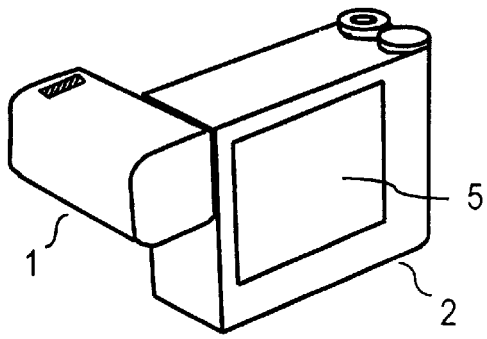
FIG. 1D is a back perspective view of the electronic video recording device in accordance with the exemplary embodiment of the present invention at recording.

As shown in FIGS. 1C and 1D, a monitor screen 5 is disposed on the rear face 2c of the main body 2, and displays electronic video information output from the video recording camera 1 and electronic video information reproduced from a recorded video tape in the form of optical information, as in the prior art. The control panel 7 comprises a group of operation switches for operating the video recording camera 1 to record video images, and is disposed on the top face 2u near the left side face 2d preferably on the top face 2u of the main body 2 so that the camera operator can hold an area of the third side face 2d and adjoining rear face 2C and front face 2a with the right hand while operating the control panel 7 for recording video images. It is preferable to configure the monitor screen 5 on the rear face 2c away from the third side face 2d of the main body 2 so that the monitor screen 5 will not be covered with the hand when the camera operator holds the main body. It is still more preferable to configure the bottom face 1c of the video recording camera 1, where the object lens 3 is disposed, at a level above the bottom face 2e of the main body 2 so that the video recording camera 1 can be rotated against the main body 2 even if the main body 2 is placed on a flat table as shown in FIGS. 1A to 1D.

The difference in the configuration of this exemplary embodiment of the present invention compared to the prior art is that the object lens 3 is disposed on the bottom face 1c of the video recording camera 1, and the microphone 6 is disposed at a lower part of the front face 1a of the video recording camera 1. Furthermore, the rotary mechanism 4 is disposed at an upper part of the second side face 2r of the main body 2 for supporting the main body 2 held by the camera operator for monitoring a subject to be recorded and the video recording camera 1 in such a way that both are rotatable. In other words, with respect to the video recording camera 1, the rotary shaft 4a of the rotary mechanism 4 is disposed away from the bottom face 1c where the object lens 3 is disposed and a lower part of the front face 1a where the microphone 6 is located. This configuration changes the distance of the optical system required for the video recording camera 1 from that of the prior art, and thus the distance can be made longer than the thickness of the main body 2, allowing more flexibility in designing the optical system. Accordingly, the optical system can be configured with, compared to the prior art, more functions and higher performance.

In fact, the thickness of the main body for comfortable holding by the camera operator is between 20 mm and 60 mm, preferably between 30 mm and 50 mm, although this dimension may depend on the weight of the electronic video recording device. To configure an optical system for video recording including CCD elements within this length, it may be, for example, necessary to restrict the zoom ratio or omit a zoom function from the optical system, or design a monofocus system. The curvature (NA) of the lens of the optical system may also need to be made extremely large. With this exemplary embodiment, however, the length of the optical system, or the video recording camera, is not restricted by the thickness of the main body. In addition, since the video recording camera is housed in the same direction as the vertical direction of the monitor on the main body, the size of the monitor can also be made larger.

A lighter electronic video recording device is naturally easier to operate, and also it will be easier to operate if the weight of the main body to be held by the camera operator is heavier than other parts supported by the rotary mechanism. The preferable weight ratio between these two parts is:

(Weight of the part supported by the rotary mechanism): (Weight of the main body held by the camera operator)=1:3 to 1:7.

In this exemplary embodiment, the video recording camera 1 supported by the rotary mechanism 4 can be made proportionally much lighter than the main body 2 comprising those sections including a video tape recorder (VTR) unit for recording video information, battery, and control panel because the video recording camera can be configured with an optical system including CCD elements. Accordingly, the above preferable weight ratio can be satisfied with the present invention. In addition, a large and robust rotary mechanism for holding the video recording camera may not be required.

The operation of the electronic video recording device as configured above is explained next.

Figure 2A:
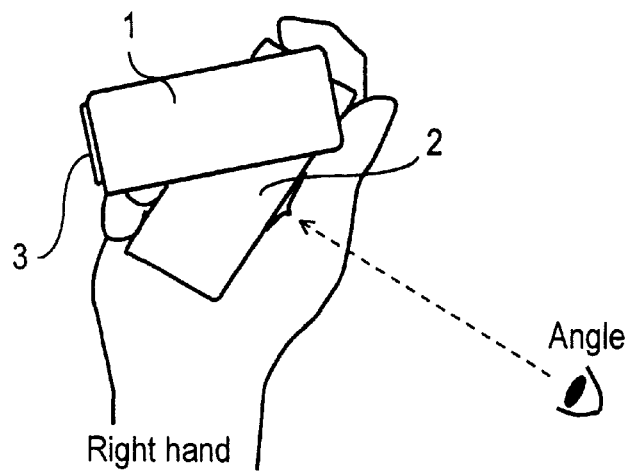
FIG. 2A illustrates recording at a high angle in accordance with the exemplary embodiment of the present invention.
Figure 2B:
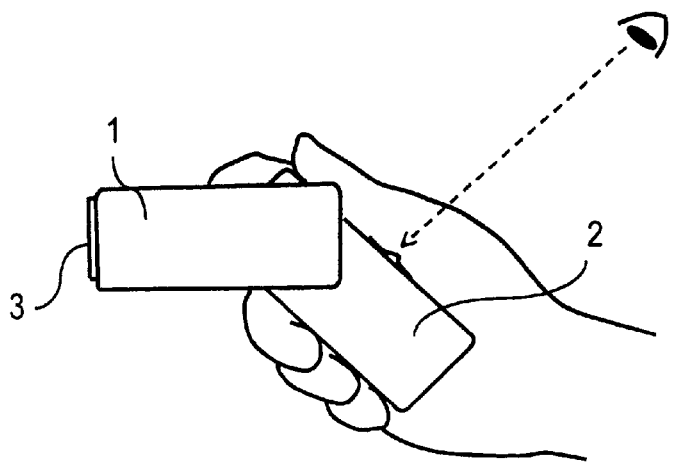
FIG. 2B illustrates recording at a chest angle in accordance with the exemplary embodiment of the present invention.
Figure 2C:
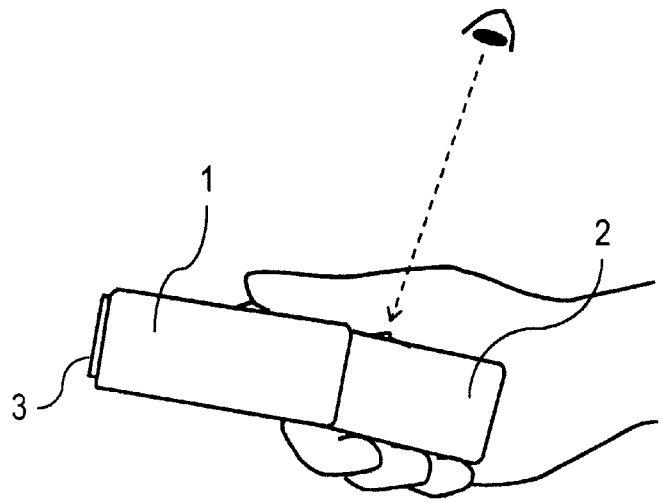
FIG. 2C illustrates recording at a low angle in accordance with the exemplary embodiment of the present invention.
Figure 3C:
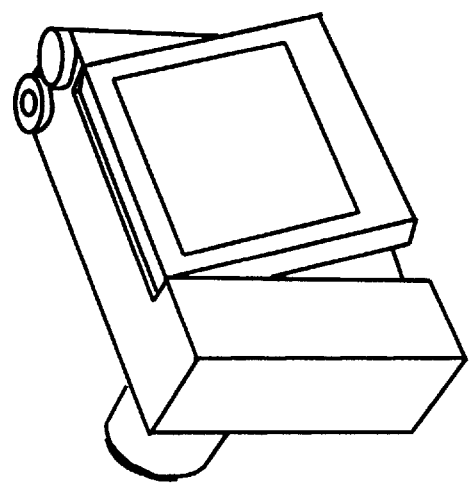
FIGS. 3B and 3C are back perspective views of the electronic video recording device of the prior art.
Figure 3B:
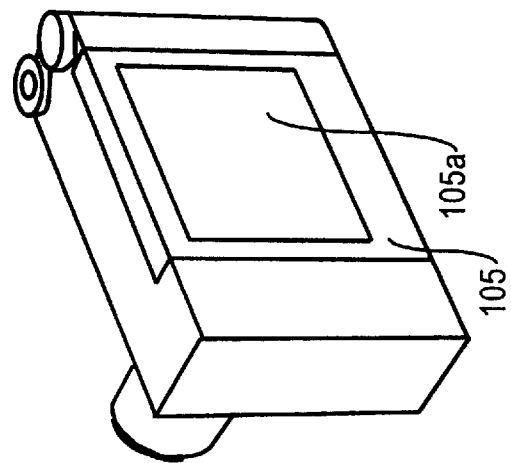
Figure 3A:
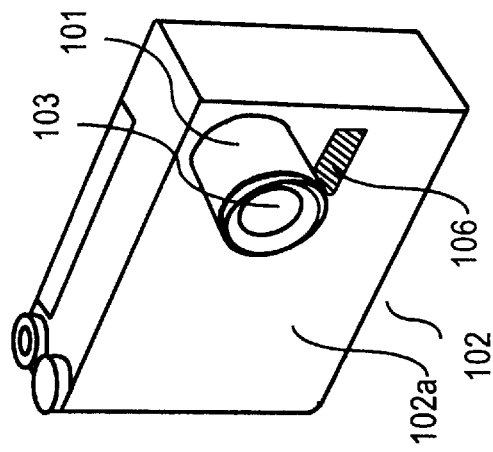
FIG. 3A is a front perspective view of an electronic video recording device of the prior art.
Figure 4A:
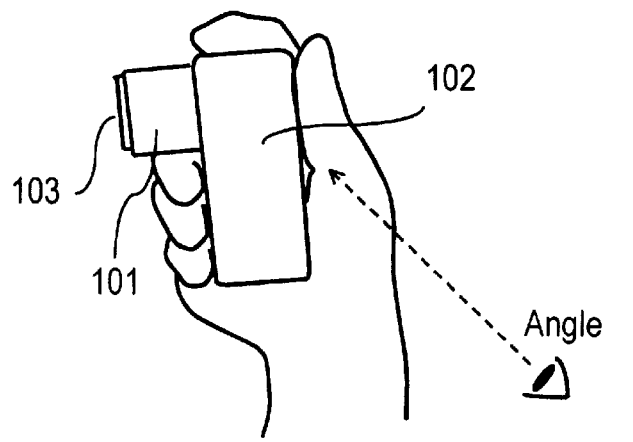
FIG. 4A illustrates recording at a high angle using the electronic video recording device of the prior art.
Figure 4B:
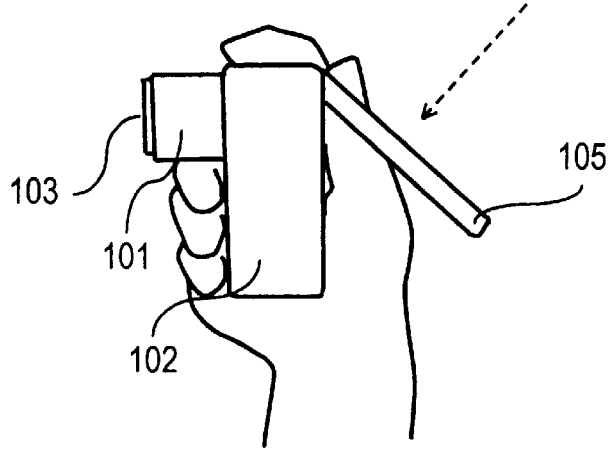
FIG. 4B illustrates recording at a chest angle using the electronic video recording device of the prior art.
Figure 4C:
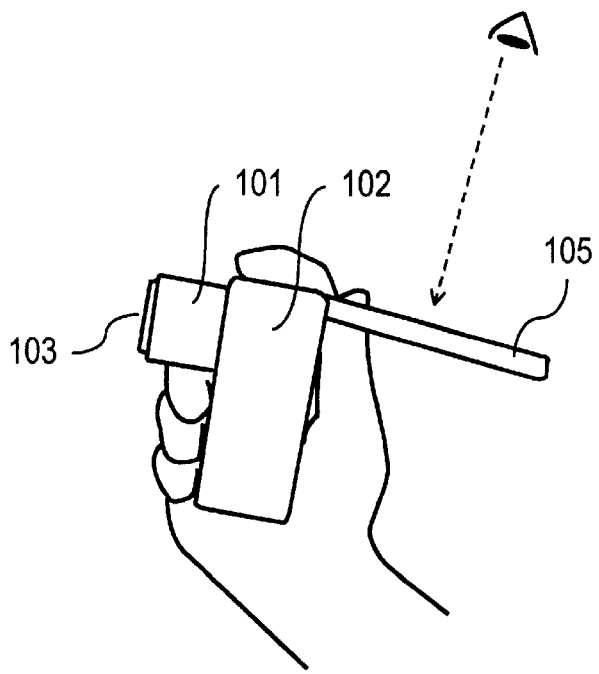
FIG. 4C illustrates recording at a low angle using the electronic video recording device of the prior art.

In ordinary recording, the video recording camera 1 is rotated to rotate the object lens 3 to face a subject, and the camera operator can confirm what is being recorded by looking at the monitor screen 5. Since the main body 2 and the video recording camera 1 are rotatable to any angle as shown in FIGS. 2A to 2C, the camera operator can always look at the monitor screen 5 from directly in front and almost at a right angle when recording at high angle (FIG. 2A), chest angle (FIG. 2B), and low angle (FIG. 2C). In other words, the main body 2 can be held by the right hand as shown in FIGS. 2A to 2C and angle of the video recording camera 1 can be changed to face a subject with the left hand because the rotary mechanism has an appropriate rotary resistance to hold the video recording camera 1 at an adjusted angle. Even if a rotating angle of the video recording camera 1 is changed to face a subject and the main body 2 is held in a position to look at the monitor screen from directly in front, the wrist angle of the hand holding the main body will not change much. This permits a subject recording without keeping the wrist at an unnatural angle for holding the main body 2.

Also in "self-recording," the camera operator can confirm himself/herself on the monitor screen 5 by rotating the main body 2 and the video recording camera 1 to make the object lens 3 approach the rear face 2c on which the monitor screen is disposed.

In addition, since the optical axis of the object lens 3 is along the lengthwise direction of the video recording camera 1, the object lens 3 can be more easily adjusted toward the direction of a subject compared to the prior art. Since the microphone 6 is disposed apart from the main body 2, the microphone 6 is unlikely to record operating noise generated from the main body 2. Furthermore, since the camera operator can operate and hold the main body 2 only with the right hand and the operation switches are disposed on the top face 2u near the third side face 2d of the main body away from the video recording camera 1, operating sound of the camera operator is also unlikely to be recorded by the microphone 6.

Next, when the electronic video recording device is not used for recording which means during reproduction of recorded video images or when the video recording camera 1 is housed, the object lens 3 of the video recording camera 1 is protected from bright light including direct sunlight, thereby avoiding damage to performance of the internal CCD image pickup elements, and protected from dust by rotating the video recording camera 1 against the main body 2 to face the object lens 3 downward.

By rotating the main body 2 and video recording camera 1 for housing, the entire device is housed to a rectangular parallelepiped shape without any protrusion, which is extremely convenient for storage. Furthermore, the video recording camera 1 can be used as a leg for supporting the tilted main body 2 by rotating the main body 2 and the video recording camera 1 so that reproduced video images can be comfortably watched on the monitor screen 5, placing the entire device somewhere without holding the main body 2 by hand.

As described above, the present invention has the following significant effects.

The distance of an optical system of the video recording camera can be determined without being restricted by the thickness of the main body. This permits improved flexibility in designing for realizing the optical system with more and better functions and higher performance by securing a longer distance for the optical system compared to that of the prior art.

The optical axis of the object lens extends along the lengthwise direction of the video recording camera. This facilitates adjustment of the object lens to a subject compared to that of the prior art. Disposition of the microphone apart from the main body also prevents collection of operating noise generated from the device or caused by the camera operator.

The object lens of the video recording camera is configured to face downward by rotating the video recording camera and the main body during reproduction and housing. This prevents damage to the performance of the internal CCD image pickup elements due to being exposed to bright light such as direct sunlight and protects the object lens from dust.

The electronic video recording device of the present invention turns into an extremely convenient shape for housing by rotating the main body and video recording camera.

The monitor screen can mostly be viewed at a right angle by rotating the video recording camera, without changing the wrist angle of the hand holding the main body, during recording at any angle.

The above explanation of the electronic video recording device refers to a video tape recorder, using a video tape as a recording medium, as an example. The configuration of the present invention is applicable to many other types of devices including electronic cameras for recording images on recording elements such as a semiconductor memory, and TV cameras which transmit electronic information of recorded images to other video information processing devices via wire or radio without using any kind of recording medium.

The preferred embodiments described herein are therefore illustrative and not restrictive. The scope of the invention being indicated by the appended claims and all modifications which come within the true spirit of the claims are intended to be embraced therein.

What is claimed is:

1. An electronic video recording device, comprising:
   a video recording camera for converting optical information received through an object lens into electronic video information;
   a monitor screen for displaying the electronic video information output from said video recording camera; and
   a main body including a control panel for operating said video recording camera and for accommodating said monitor screen;
   wherein said monitor screen is disposed on a rear face of said main body, said control panel is disposed on a side face thereof, and a rotary mechanism connected to said video recording camera is disposed on another side face thereof in which a rotary shaft is disposed in a direction approximately perpendicular to said another side face and disposed above the center of said another side face of said main body; and an incident optical axis of said object lens of the video recording camera is approximately perpendicular to said rotary shaft of the rotary mechanism such that said object lens faces when in a housed position a direction approximately parallel to said rear face of said main body and opposite to said side face having said control panel, and said object lens for receiving optical information for the video recording camera is disposed on one of two faces perpendicular to an incident optical axis of said video recording camera which is farther from said rotary shaft.

2. An electronic video recording device as defined in claim 1, wherein, when in a housed position, a level of a face of said object lens on said video recording camera is spaced from a side face of said main body opposite said side face having said control panel.

3. An electronic video recording device as defined in claim 1, wherein said monitor screen is disposed on the rear face of the main body away from said side face near to which said control panel is disposed.

4. An electronic video recording device as defined in claim 1, wherein a microphone for recording sound is disposed proximate said object lens on the video recording camera.

5. An electronic video recording device as defined in claim 1,
   wherein the weight ratio of said video recording camera and said main body is between 1:3 and 1:7.

* * * * *